April 18, 1967   W. H. JACOBSEN   3,314,397
BIRD FEEDER
Filed Jan. 5, 1966

INVENTOR.
WALTER H. JACOBSEN
BY

United States Patent Office 3,314,397
Patented Apr. 18, 1967

3,314,397
BIRD FEEDER
Walter H. Jacobsen, Ivy Land, Pa., assignor to General Plastic Corporation of America, Philadelphia, Pa., a corporation of Pennsylvania
Filed Jan. 5, 1966, Ser. No. 518,894
1 Claim. (Cl. 119—18)

My invention relates to a bird seed holder of the type which is intended for use by small caged birds and one example of which is shown in Patent No. 3,066,648.

One object of the invention is to produce an improved bird seed holder of the type set forth.

Bird seed holders for small caged birds should permit ample reach so that the bird can pick up the last grain. To this end, it was proposed to make the seed holders both shallow and wide-mouthed. Such holders provided ample reach, but they also permitted the bird to perch on an edge of the seed holder and in this position the bird droppings fell on the seed and made it inedible. To avoid this difficulty, it has been proposed to provide the holder with a hood which prevented perching but which also drastically reduced the reach of the bird and rendered portions of the interior of the feeder inaccessible.

It is therefore a further object to produce an improved seed holder, the entire interior of which is readily accessible and which effectively prevents perching to protect the seed against contamination by droppings.

A bird seed holder should be light, easy-to-clean and inexpensive. Also, it preferably should be transparent or translucent.

It is therefore a still further object of the invention to produce a bird seed holder which can be molded, in one operation from any one of currently available, moldable synthetic materials such as styrene, methyl methacrylate, nylon, or the like.

The full nature of the invention will be understood from the following specification and the accompanying drawings in which.

Figure 1:
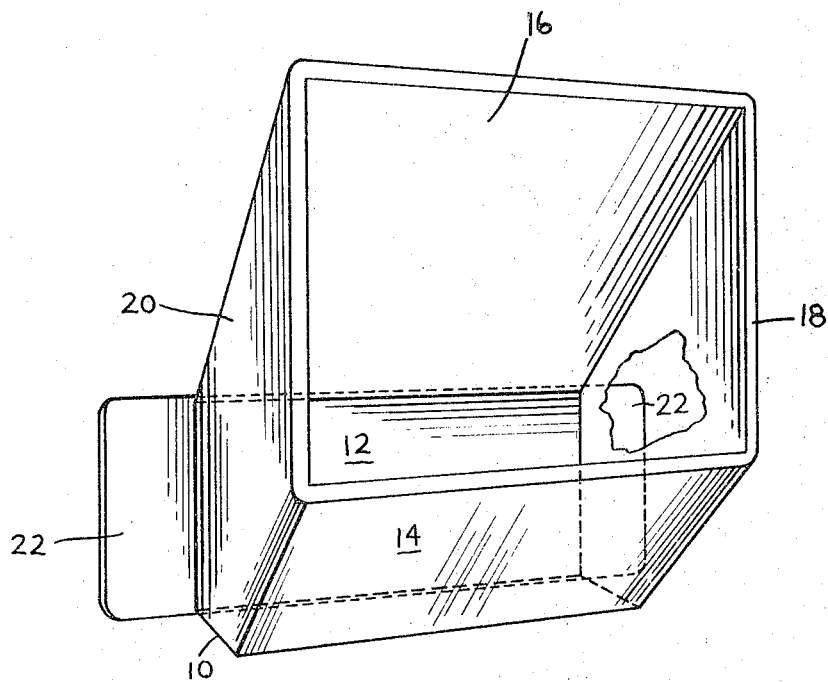
FIG. 1 is a perspective view of a bird seed holder embodying the invention.
Figure 2:
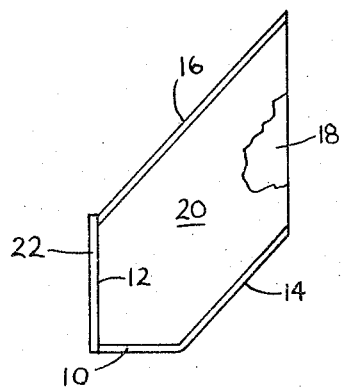
FIG. 2 is a reduced side elevational view of the same.

A bird seed holder embodying my invention includes a base 10, which, when the holder is mounted for use, will be substantially horizontal, and a back wall 12 which, in said use position will be substantially vertical. Sloping upwardly and forwardly from the front edge of base 10 is a front wall 14 which is parallel to an upper wall 16 which, as shown in FIG. 2 extends upwardly and forwardly from the upper edge of back wall 12 so as to overhang wall 14. The enclosure of the seed holder is completed by side walls 18 and 20. It will be noted that back wall 12 extends beyond side wall 18 and 20 to form tabs 22 by which the holder may be secured to the wall of a cage or other support. Tabs 22 may be replaced by hooks.

It will be seen that the parts of the holder are so designed that the entire holder can be molded, in one operation, and that upper wall 16 which overhangs lower front wall 14, effectively prevents perching in a position which permits droppings to fall on the seed in the holder. It will also be seen that the slant of lower wall 14 in relation to the relatively narrow base is such as to permit a bird perched in front of the holder to reach the entire interior of the holder including the junction of base 10 and wall 14. In other words, there is not sufficient vertical space between the front edges of walls 14 and 16 to permit a bird to perch on the edge of wall 14 in any position, however, the vertical space is sufficient for a bird perching on a feeding rod located in front of the receptacle to have access to seed in any part of the receptacle.

What I claim is:
A bird seed holder including:
a base wall,
a back wall extending upwardly from the rear edge of said base wall,
a front wall slanting upwardly and forwardly from the front edge of said base wall and disposed at an obtuse angle relative thereto,
an upper wall slanting forwardly and upwardly from the upper edge of said back wall and disposed in a plane at an angle relative to the plane of said back wall,
said upper wall being substantially parallel to said front wall and the front edge of said upper wall overhanging said front wall, and
end walls connecting the adjacent edges of said base wall and said upper and front walls to said back wall, said walls being proportioned to enable a bird perched in front of the holder to reach the entire interior of the holder.

References Cited by the Examiner
UNITED STATES PATENTS

| | | | |
|---|---|---|---|
| 1,737,797 | 12/1929 | Jacot | 119—61 |
| 1,798,984 | 3/1931 | Petersen | 119—61 |
| 1,874,418 | 8/1932 | Bantz et al. | 119—61 |
| 2,190,119 | 2/1940 | Hoefler | 119—17 |
| 2,309,830 | 2/1943 | Dearle | 119—18 |
| 2,545,105 | 3/1951 | Niskala et al. | 119—61 |
| 3,066,648 | 12/1962 | Kohlhauf | 119—51 |

SAMUEL KOREN, *Primary Examiner.*
HUGH R. CHAMBLEE, *Examiner.*